(12) United States Patent
Terwilliger et al.

(10) Patent No.: US 10,673,948 B2
(45) Date of Patent: Jun. 2, 2020

(54) TRAILER IDENTIFICATION, INSPECTION, AND VERIFICATION USING A VEHICLE GATEWAY

(71) Applicant: Dell Products L.P., Round Rock, TX (US)

(72) Inventors: Kevin Terwilliger, Austin, TX (US); Andrew Tosh, Cedar Park, TX (US); Jefferson Walter Wirtz, Round Rock, TX (US); Rex Bryan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 681 days.

(21) Appl. No.: 15/286,435

(22) Filed: Oct. 5, 2016

(65) Prior Publication Data

US 2018/0097884 A1    Apr. 5, 2018

(51) Int. Cl.
*G06F 15/173*    (2006.01)
*H04L 29/08*    (2006.01)

(52) U.S. Cl.
CPC .............. *H04L 67/12* (2013.01); *H04L 67/18* (2013.01); *H04L 67/24* (2013.01)

(58) Field of Classification Search
CPC .......... H04L 67/18; H04L 67/12; H04L 67/24
See application file for complete search history.

(56) References Cited

U.S. PATENT DOCUMENTS

| 6,154,658 | A | 11/2000 | Caci |
| 6,996,469 | B2 | 2/2006 | Lau et al. |
| 8,075,484 | B2 | 12/2011 | Moore-Ede |
| 8,935,119 | B2 | 1/2015 | Yuen |
| 8,972,175 | B2 | 3/2015 | Annapureddy et al. |
| 9,026,343 | B2 | 5/2015 | Mays |
| 9,931,976 | B1 * | 4/2018 | Terwilliger ............. H04W 4/40 |
| 10,178,533 | B2 * | 1/2019 | Saldin .................. G08B 25/008 |
| 2013/0148748 | A1 * | 6/2013 | Suda ...................... H04B 3/546 375/257 |
| 2014/0240132 | A1 | 8/2014 | Bychkov |
| 2015/0325062 | A1 | 11/2015 | Mason et al. |
| 2018/0093623 | A1 * | 4/2018 | Terwilliger ........ G01C 21/3469 |
| 2018/0093672 | A1 * | 4/2018 | Terwilliger .............. A61B 5/18 |
| 2018/0096289 | A1 * | 4/2018 | Terwilliger ............ G06Q 50/28 |
| 2018/0096293 | A1 * | 4/2018 | Terwilliger ............. H04W 4/70 |
| 2018/0097884 | A1 * | 4/2018 | Terwilliger ............. H04L 67/12 |

FOREIGN PATENT DOCUMENTS

WO    WO-2015134372 A1    9/2015

\* cited by examiner

*Primary Examiner* — Thanh T Nguyen

(74) *Attorney, Agent, or Firm* — Norton Rose Fulbright US LLP

(57) ABSTRACT

Electronic components may be integrated in objects used by the trucking industry, such as truck, tractor trailer, cargo, and loading bay. These objects may then communicate with each other and with a gateway device to transmit or receive data or commands. The gateway may be configured to attach to the truck, such as by securing to the truck frame or securing to an interior of the truck cab. The gateway may couple to one or more input devices, and receive sensor data through the one or more input devices. The gateway may execute steps that allow the gateway to verify a trailer being picked up by a truck is the correct trailer and verify proper inspection of the trailer prior to transport.

20 Claims, 11 Drawing Sheets

TRAILER IDENTIFICATION, INSPECTION, AND VERIFICATION USING A VEHICLE GATEWAY

FIELD OF THE DISCLOSURE

This application is related by subject matter to U.S. patent application Ser. No. 15/286,476 filed on Oct. 5, 2016 and entitled, "Cargo Geofencing using a Vehicle Gateway," to U.S. patent application Ser. No. 15/286,499 filed on Oct. 5, 2016 and entitled, "Trailer Loading using a Vehicle Gateway," to U.S. patent application Ser. No. 15/286,520 filed on Oct. 5, 2016 and entitled, "Truck Safety Zone using a Vehicle Gateway," to U.S. patent application Ser. No. 15/286,526 filed on Oct. 5, 2016 and entitled, "Vehicle Firmware Update using a Vehicle Gateway," and to U.S. patent application Ser. No. 15/286,534 filed on Oct. 5, 2016 and entitled, "Determining a Driver Condition using a Vehicle Gateway."

FIELD OF THE DISCLOSURE

The instant disclosure relates to electronic devices. More specifically, portions of this disclosure relate to integration of electronic devices in the operation of vehicles.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have garnered ubiquitous use in certain fields, such as financial transactions, data storage, and the like. This is due, in part, to the ability of information handling systems to handle large numbers of tasks with significantly fewer errors than other techniques. Information handling systems can be designed or programmed specifically to perform certain functions, and thus take advantage of further speed advantages from this customization. However, there are certain industries and fields that have historically not modernized to take advantage of the capabilities of information handling systems, or to not fully take advantage of such systems by having specially-designed components. One such industry is the trucking industry. Tractor trailers are responsible for a significant amount of merchandise movement throughout the country and continent, and typically also a part of every merchandise's journey. The population is continuously growing, and also the demand for merchandise. Thus, the trucking industry is also continuously growing. The number of tractor trailers on the road and the number of deliveries by each tractor trailer are continuing to increase. Yet, there has been little modernization of the trucking industry.

However, lack of modernization and implementation of information handling systems has caused many problems with operation of a fleet of tractor trailers. As one example, there is little to no monitoring of truck driver health, such as enforcement of sleep requirements or monitoring of other health issues, which can result in unsafe driving and collisions involving tractor trailers. As another example, fuel efficiency is critical to profit margins of the tractor trailers, and yet there is little or no monitoring of engine operating conditions. As yet another example, the distribution of freight within a tractor trailer can impact operational efficiency and driving stability, and yet there is no optimization of freight arrangements within the tractor trailer. As a further example, the only monitoring of tractor trailers is through GPS devices with limited functionality. Thus drivers often pick up the wrong trailer in a shipping yard, which leads to lost or misdirected merchandise and lost profit.

SUMMARY

Electronic components may be integrated in objects used by the trucking industry, such as truck, trailer, cargo, and loading bay. These objects may then communicate with each other and/or with a gateway device to transmit or receive data or commands. The communications between devices may include relay of information from the objects to a remote server through the Internet. Either the gateway device or the remote server may use the relayed information to verify certain information or provide instruction to vehicle operators to improve efficiency and accuracy of the trucking industry. For example, by verifying trailers assigned to trucks have been picked up by the correct trucks, a reduction in misdirected or lost merchandise is obtained. As another example, by ensuring inspection checklists are completed, costly malfunctions may be avoided and profit margins increased. As a further example, by monitoring the health of the user, the user may feel more secure and happy with their job and thus drivers may be retained longer.

A vehicle gateway, or just "gateway," may be configured to attach to the truck, such as by securing to the truck frame or securing to an interior of the truck cab. The gateway may receive power from the vehicle power system and/or an independent power supply, such as a battery or solar cell. Although vehicle gateways are described as part of a vehicle, the gateways may be used in areas outside of the vehicle such as in loading bays, parking areas, or the like. The gateway may couple to one or more input devices to receive sensor data. The gateway may also be configured, for some of the input devices, to transmit commands to alter operation of certain components onboard or off-board the vehicle. For example, one input device may be a communications radio, such as a Wi-Fi radio, Bluetooth radio, cellular communication radio, or other short-range or long-range communication radio. Through the communications radio the gateway may receive sensor data, for example, from sensors located throughout the trailer or nearby the trailer (e.g., in range of the communications radio). For example, the sensors may be attached to the trailer. In another example, the sensors may be in nearby containers and/or in nearby vehicles. As another example, an input device may be an interface for connecting to an engine computer, such as an OBDII port. The gateway may process raw data received from the electronic components, store the raw or processed data, and/or relay the raw or processed data to a remote server.

The integration of electronic components in the trucking industry makes available new applications for these electronic components and improves operations and efficiency in the trucking industry. For example, beacon devices, or just "beacons," may be integrated with trailers and a vehicle gateway may activate the beacon to determine the trailer identification and verify the correct trailer is being picked up by the vehicle. The beacons may include a memory circuit with stored information and a communications circuit for communicating the stored information to a gateway. As another example, the vehicle gateway may communicate with biometric systems, including mobile devices such as smart watches and mobile phones, to collect information regarding driver behaviors, such as sleep patterns, to assess a condition of the driver. As a further example, electronic sensors may be integrated throughout a tractor trailer and communicate with the vehicle gateway to monitor and/or optimize loading of cargo into the tractor trailer. As yet another example, beacons may be attached to cargo containers and the beacons linked with contents of the cargo such that a vehicle gateway may determine conflicts that may exist between different cargo contents that may create a hazardous condition. As another example, vehicle gateways may communicate with other vehicle gateways to determine and/or optimize formation of vehicle platoons and provide information that ensures safety of nearby vehicles. As a further example, a vehicle gateway may monitor driving conditions and/or a planned truck route to determine when a different engine firmware may provide better fuel efficiency or other benefits and then update the engine firmware with an appropriate firmware.

The vehicle gateway may operate as a data collection device and/or a data processing device. As described throughout, the gateway may receive data from input devices that communicate with beacons, sensors, mobile devices, or other components. This data may be forwarded through, for example, cellular communications systems to cloud-based server that process the data. A driver or other user may then access a dashboard presenting the information and/or alerts based on the information through a web-based interface. Further, the driver or other user may issue commands to the vehicle gateway that are relayed to components in communications with the gateway. The commands may include, for example, remotely updating an engine firmware, changing a vehicle route, establishing new stops on the route, providing messages to a driver, or placing operating restrictions on the vehicle. Cloud-based servers may also automate certain functions by performing monitoring of the received data and sending commands to the gateway when certain conditions are satisfied. Although the gateway may communicate with cloud-based server, the gateway may also independently perform some or all of these functions. For example, a driver or user may access the gateway through a mobile device or nearby computer to access data stored on the gateway. Further, the gateway may process the data and analyze the data to determine if certain conditions are satisfied and take action, such as by transmitting alerts to the driver or another user.

According to embodiments, a method of verifying a trailer being picked up by a truck may include receiving an expected identifier for the trailer from a user or remote server, receiving an identifier for the trailer from the beacon, and comparing the received identifier with the expected identifier to determine whether the trailer should or should not be coupled to the vehicle. When the received identifier does not match the expected identifier, an alert may be generated to indicate the mismatch between the received identifier and the expected identifier. In certain embodiments, the method may be executed by an information handling system. In some embodiments, the information handling system may include a gateway configured to attach to a vehicle. The gateway may couple to an input device such as a communications radio for communicating with a beacon in a trailer.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be adapted to provide services to vehicles, to fleets of vehicles, and/or to drivers of vehicles. Such information handling systems may be particularly useful in the trucking industry, where historically little modernization has occurred. Some hardware and software components for such information handling systems are described in further detail below. One such hardware component is a vehicle gateway that is configured to attached to a vehicle, such as a tractor pulling a trailer. The vehicle gateway may communicate with electronic components in and around the vehicle through wired and wireless communications paths. The gateway may also execute software components for processing the data, triggering alerts, making recommendations, and/or adjusting operation of the vehicle.

Figure 1:
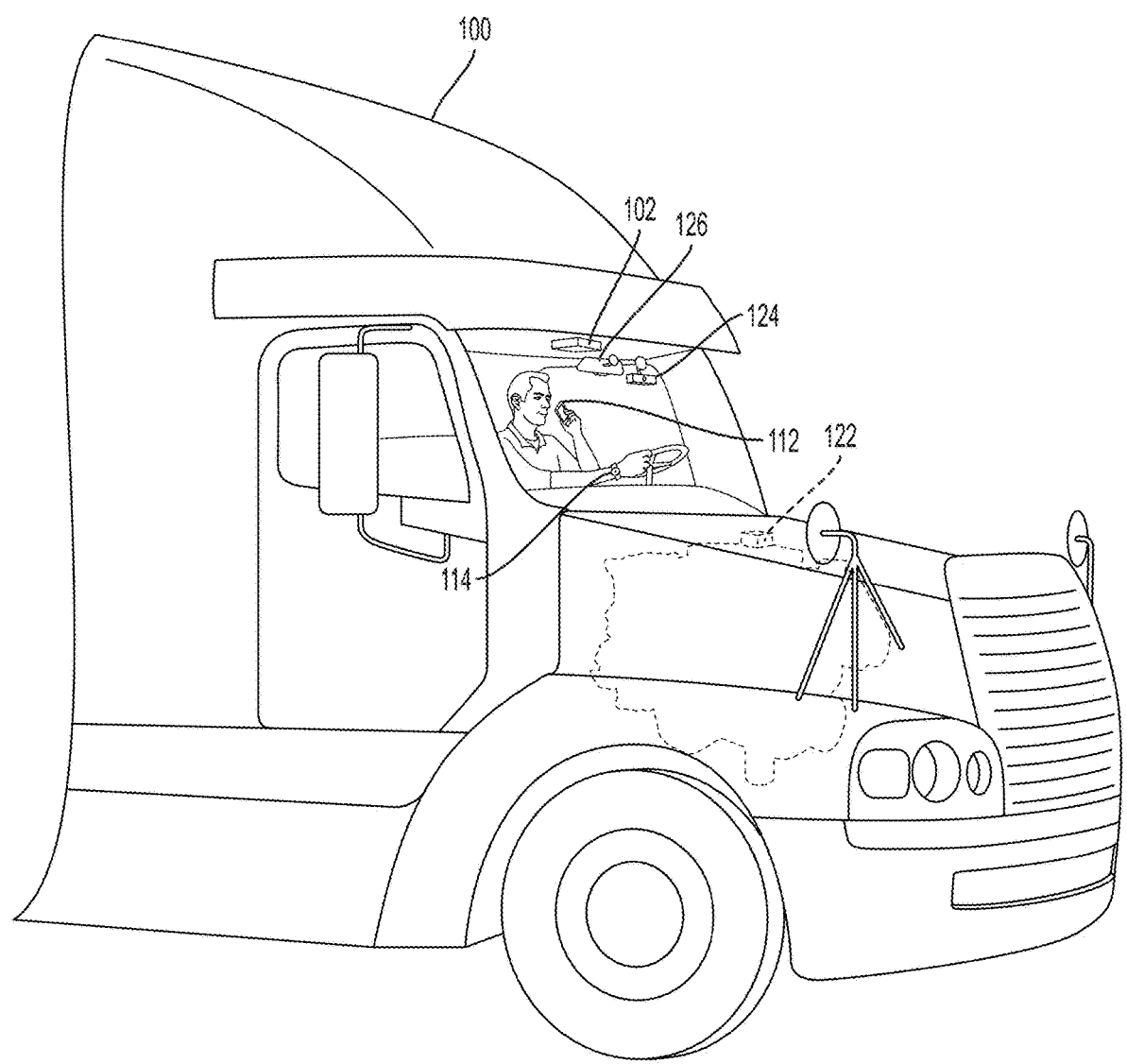
FIG. 1 is a perspective view of a vehicle illustrating an installed gateway for communicating with electronic components in or around the vehicle according to one embodiment of the disclosure.

FIG. 1 is a perspective view of a vehicle illustrating an installed gateway for communicating with electronic components in or around the vehicle according to one embodiment of the disclosure. A vehicle 100 may be a truck with tractor trailer, as shown, or another kind of vehicle, such as a car or sport-utility vehicle (SUV), or another transportation device, such as a cargo boat or aircraft. A gateway 102 may be configured to attach to and attached to the vehicle 100, such as by a screw, bolt, Velcro, adhesive, or other fixing means that affixes the gateway 102 to a component of the vehicle 100, such as a frame or an interior of a cab of the vehicle 100. In some embodiments, the gateway 102 may be a separate component inside the vehicle 100. In some embodiments, the gateway 102 may be integrated with another component attached to the vehicle 100, such as an in-dash display or radio. The gateway 102 may be connected to power or communications systems of the vehicle 100. For example, the gateway 102 may be powered from a 12 Volt direct-current (DC) bus operated by a battery in the vehicle 100. Additionally or alternatively, the gateway 102 may include a back-up or other separated power system to operate the gateway 102 when the vehicle 100 is turned off or when the vehicle 100 malfunctions.

The gateway 102 may communicate with electronic components in and around the vehicle 100 through input devices coupled to the gateway 102. For example, a driver may have a mobile phone 112, a smart watch 114, and/or other electronic devices, such as a tablet computer, a laptop computer, a television, a radio, a GPS device, etc. These mobile devices 112 and 114 may communicate with the gateway 102 through an input device such as, for example, a Bluetooth radio, a Wi-Fi radio, a near field communications (NFC) radio, or other short-range communications radio. As another example, an engine of the vehicle 100 may have an engine computer 122. The gateway 102 may include an input device configured to communicate with the engine computer 122, such as an ODBII port. The gateway 102 may be further coupled to other electronic devices, such as a road-facing camera 124 and/or an eye-tracking system 126, by either wireless or wired connections similar to that described in the examples above. The eye-tracking system 126 may be used to monitor eye movement of a driver, which can provide information regarding, for example, the driver's alertness.

Figure 2:
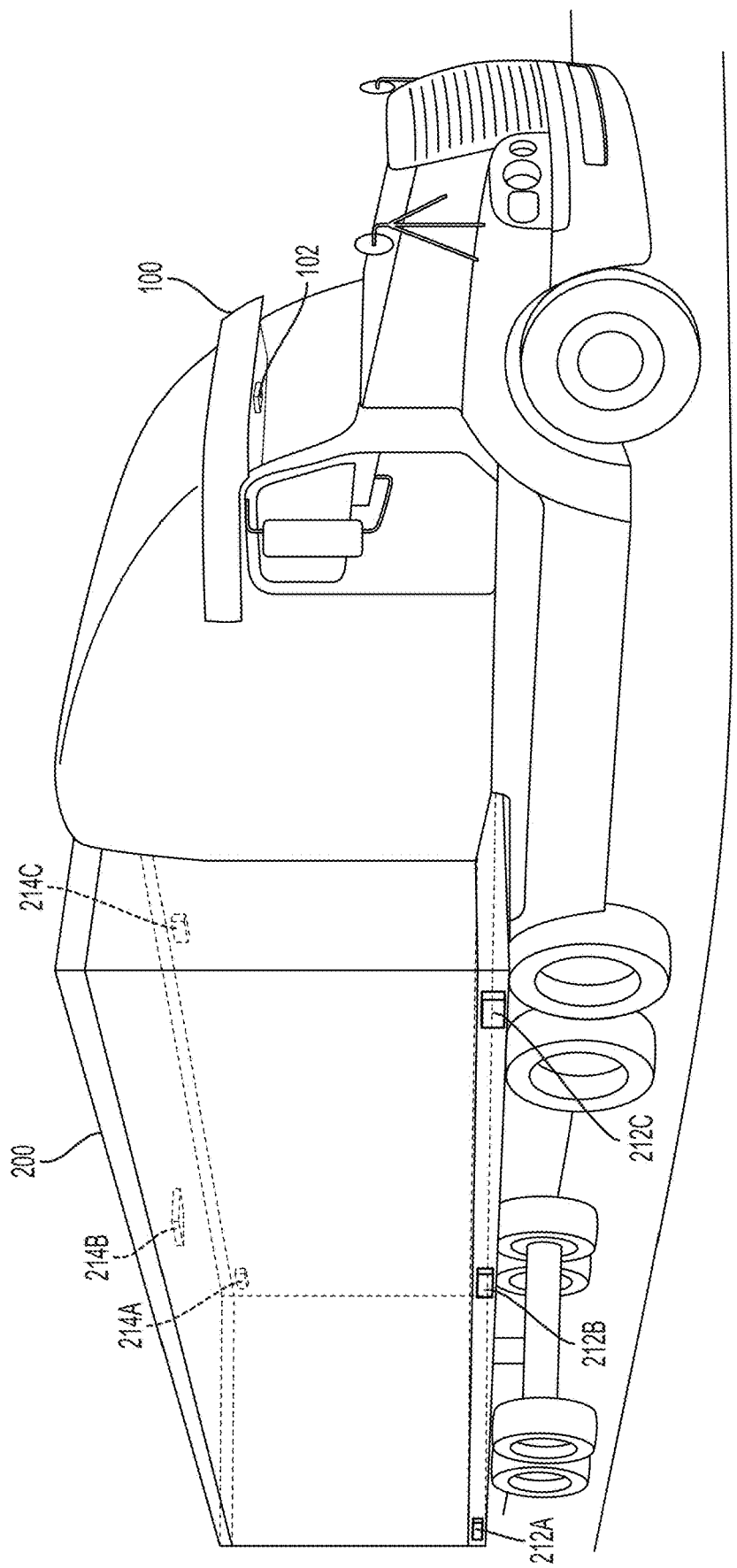
FIG. 2 is a perspective view of a vehicle illustrating an installed gateway for communicating with sensors in and around a tractor trailer attached to the vehicle according to one embodiment of the disclosure.
Figure 3:
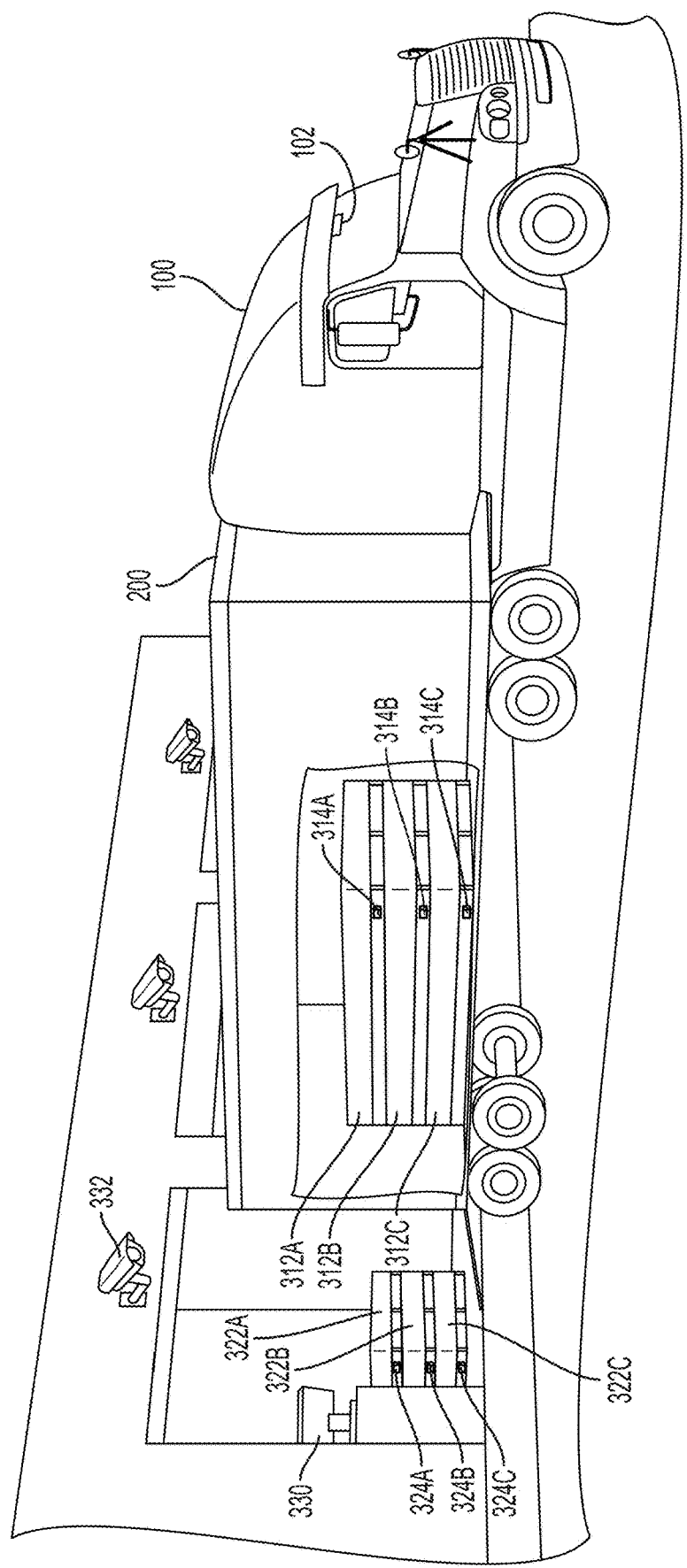
FIG. 3 is a perspective view of a vehicle illustrating an installed gateway for communicating with electronic components in and around the vehicle and in and around a loading bay according to one embodiment of the disclosure.
Figure 4:
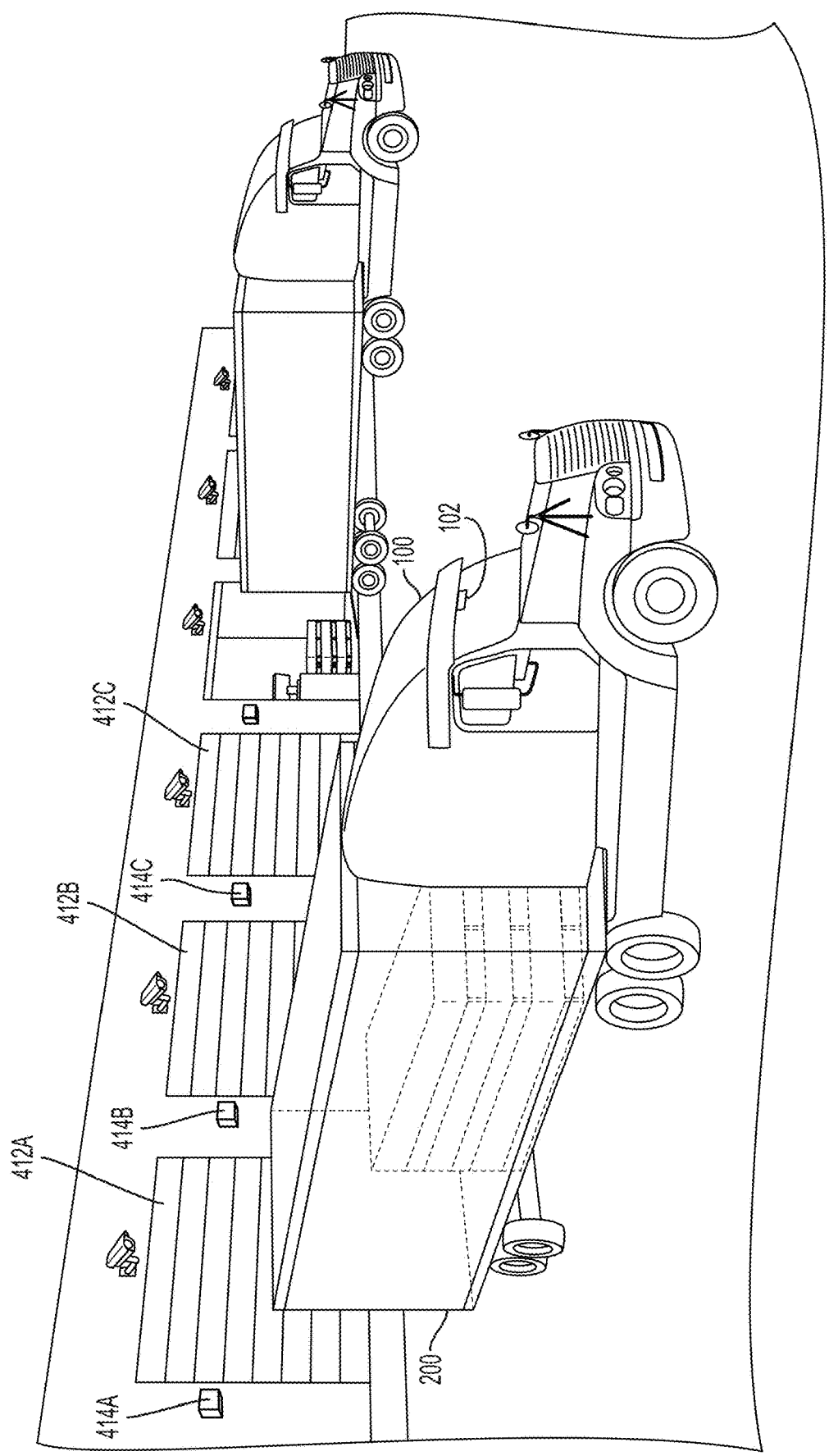
FIG. 4 is a perspective view of a vehicle illustrating an installed gateway for communicating with electronic components in cargo and around a loading bay or other nearby vehicles according to one embodiment of the disclosure.

FIG. 1 shows one configuration of wireless devices that includes user mobile devices 112 and 114, the engine computer 122, the camera 124, and the tracking system 126. However, any combination of electronic devices may be used in combination with the vehicle gateway 102 of embodiments. For example, although FIG. 1 illustrates electronic devices in and around the truck cab, electronic devices may be anywhere in communications range. For example, devices may be in an attached or nearby truck trailer, as shown in FIG. 2, wherein a nearby truck trailer may be a truck trailer within short-range communications range of the vehicle 100. Communications with nearby beacons and gateways may allow, for example, a gateway to identify locations of missing or stolen trailers or cargo when passing within short-range communications range. Further, the vehicle gateway 102 may communicate with stationary gateways and electronic devices, such as beacons, sensors, devices, and gateways in a loading bay as shown in FIG. 3 and FIG. 4. The gateway 102 may also communicate with gateways on other vehicles. For example, a plurality of gateways installed on a plurality of vehicles may communicate with each other to form a mesh network allowing one of the gateways to communicate through other gateways when its long-range communications radio is not functioning correctly.

FIG. 2 is a perspective view of a vehicle illustrating an installed gateway for communicating with sensors in and around a tractor trailer attached to the vehicle according to one embodiment of the disclosure. The gateway 102 may be coupled to or integrated with an input device, such as a low-power RF radio for wireless communications, to communicate with electronic devices 212A, 212B, and 212C attached to a tractor trailer 200. The devices 212A-C may be, for example, sensors (e.g., GPS receivers) or cameras. The devices 212A-C may report loading of the cargo in the trailer or air pressure in tires of the trailer. The same input device may also be used to communicate with electronic devices 214A-C inside the tractor trailer. The devices 214A-C may be beacons attached to cargo that provide information about cargo carried by the tractor trailer or cameras mounted in the interior of the trailer. Example uses of devices attached to the frame and inside the trailer are provided below. The gateway 102 may collect information from the devices 212A-C and 214A-C. The information may be processed by the gateway 102 and used, for example, to assist in arranging cargo in the trailer and in verifying loading of correct cargo in the trailer.

FIG. 3 is a perspective view of a vehicle illustrating an installed gateway for communicating with electronic components in and around the vehicle and in and around a loading bay according to one embodiment of the disclosure. The gateway 102 may communicate with electronic devices outside the vehicle, such as in a loading bay, to facilitate management of cargo in the trailer. For example, cargo pallets 312A, 312B, and 312C inside of the trailer 200 may each have an attached electronic device 314A, 314B, and 314C, respectively, such as a beacon. The beacons 314A-C may transmit cargo identification information that includes an identifier for the attached cargo pallet. The beacon 314A-C may also transmit other information, such as contents of the cargo pallet. In some embodiments, the beacons 314A-C may be active devices that are continuously transmitting data. In other embodiments, the beacons 314A-C may be passive devices that only transmit information when interrogated, similar to RFID tags. Additional cargo pallets 322A, 322B, and 322C may be located inside the loading bay, with attached beacons 324A, 324B, and 324C, respectively. The beacons 324A-C may communicate with the gateway 102 directly. The beacons 324A-C may also communicate with a second gateway 330 inside the loading bay, which may relay information to the gateway 102. Additional electronic devices, inside or outside the trailer 200, may provide further information, such as to verify correct loading of cargo. For example, cameras 332 may capture images or video of the loading of cargo pallets 312A-C and/or 322A-C to provide visual confirmation to verify information from the beacons 322A-C and 324A-C. For example, a gateway 102 may determine if an approximate size of the pallet 312A matches a size of the cargo contents indicated by beacon 322A.

FIG. 4 is a perspective view of a vehicle illustrating an installed gateway for communicating with electronic components in cargo and around a loading bay or other nearby vehicles according to one embodiment of the disclosure. When a vehicle is moving, some electronic devices may enter and exit communications range of the gateway 102. For example, as a tractor trailer drives through a set of loading bays, the gateway 102 may establish communication with each of the electronic devices 414A, 414B, and 414C associated with loading bays 412A, 412B, and 412C, respectively. The gateway 102 may communicate with the electronic devices 414A-C to determine a correct loading bay. The gateway 102 may also communicate with the electronic devices 414A-C to determine if any of the loading bays 412A-C contain cargo that could be potentially hazardous if in close proximity to cargo carried in the trailer. As another example, a vehicle may drive through the loading bays with a gateway 102 to inventory the cargo in the loading bays 412A-C. This would allow for periodic updating of the location of cargo and the ability to find misplaced cargo by driving a vehicle through the loading bay. Alternatively or additionally, the tractor trailers may scan for missing cargo as they drive through the loading bay to pick up or drop-off cargo.

Figure 5:
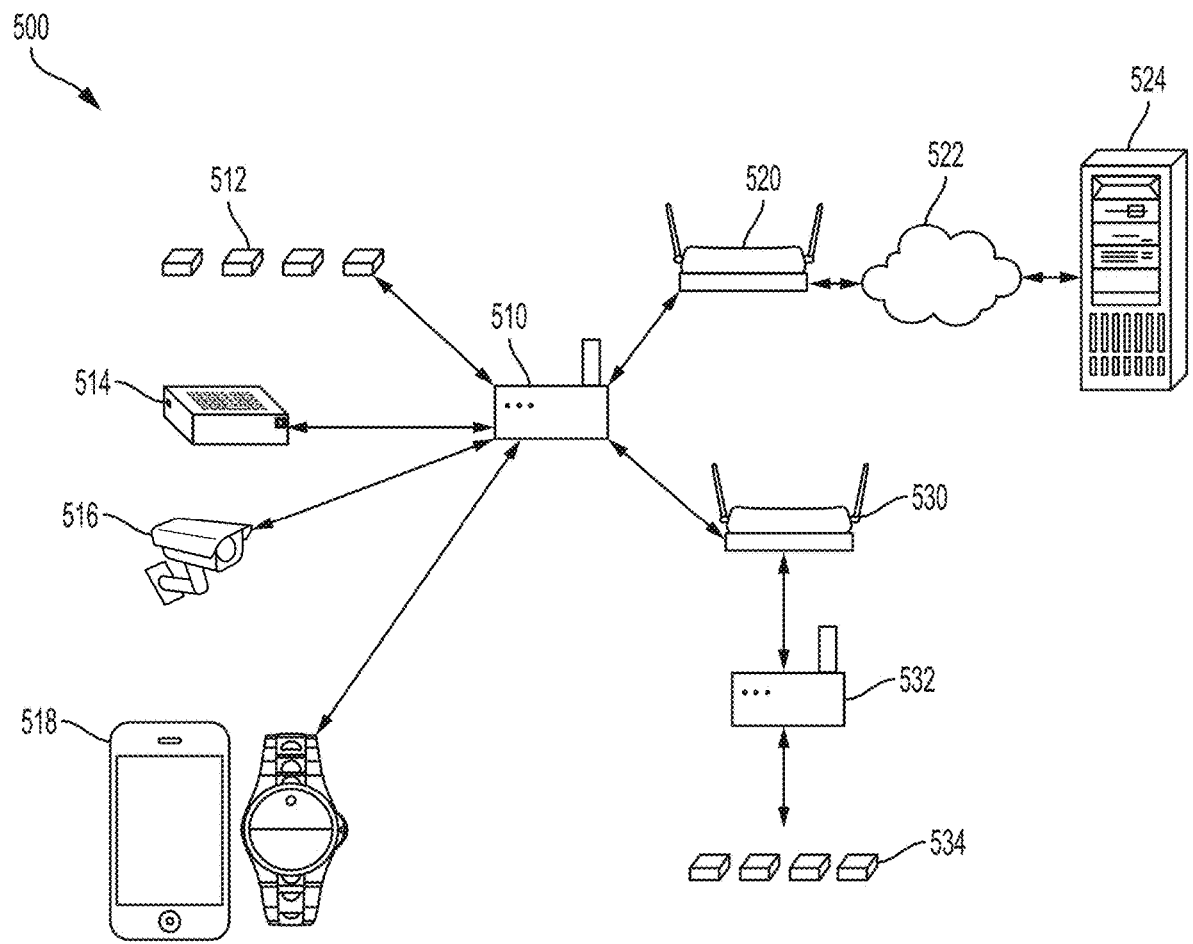
FIG. 5 is a block diagram illustrating communications paths around a vehicle gateway for communicating with electronic components according to one embodiment of the disclosure.

As described in the examples above, many combinations of electronic devices such as shown in FIG. 1, FIG. 2, FIG. 3, and FIG. 4 may be configured to operate with a vehicle gateway. An illustration of communications between the electronic devices is described in FIG. 5 without reference to any particular application. FIG. 5 is a block diagram illustrating communications paths around a vehicle gateway for communicating with electronic components according to one embodiment of the disclosure. A gateway 510 may be coupled to and/or include various input devices to accommodate communication with a variety of devices in different configurations. The gateway 510 may be programmed, such as through firmware or software, to perform a number of different functions involving the various electronic devices. Although certain trucking examples are described in FIG. 1, FIG. 2, FIG. 3, FIG. 4, and the examples below, the gateway 510 may be configured to perform many other functions. For example, rather than using the gateway 510 on a truck for cargo management, the gateway 510 may be installed in a passenger vehicle and used to assist a driver on a cross-country trip. Further, the gateway 510 need not be limited to land vehicles, but may also be used in other configurations, such as on boats and aircraft for tracking cargo.

The gateway 510 may be coupled to and/or include input devices for communicating with local electronic devices that are in or near the vehicle. For example, the gateway 510 may be configured with wireless or wired communication input devices to receive data from vehicle sensors 512, an engine computer 514, cameras 516, and/or mobile devices 518. The input devices configured to communicate with the devices 512, 514, 516, and/or 518 may include wired communications interfaces, such as Ethernet, OBDII, serial, or parallel interfaces, and/or wireless communications interfaces, such as Wi-Fi, Bluetooth, ZigBee, RFID, or NFC.

The gateway 510 may also be coupled to input devices, such as modem devices, for communicating with electronic devices away from the vehicle. For example, the gateway 510 may be coupled to a long-range communications modem 520 for communicating over a network 522, such as the Internet, with remote servers 524. The remote servers 524 may offer storage and/or processing capabilities that enhance the function of the gateway 510. As another example, the gateway 510 may be coupled to and/or include a short-range communications modem 530 for communicating with a second gateway 532. The second gateway 532 may be attached to a second vehicle and be configured to communicate with electronic devices 534 in or near the second vehicle. The gateway 510 may have access to raw data from the electronic devices 534 and/or receive processed data from the second gateway 532.

Figure 6:
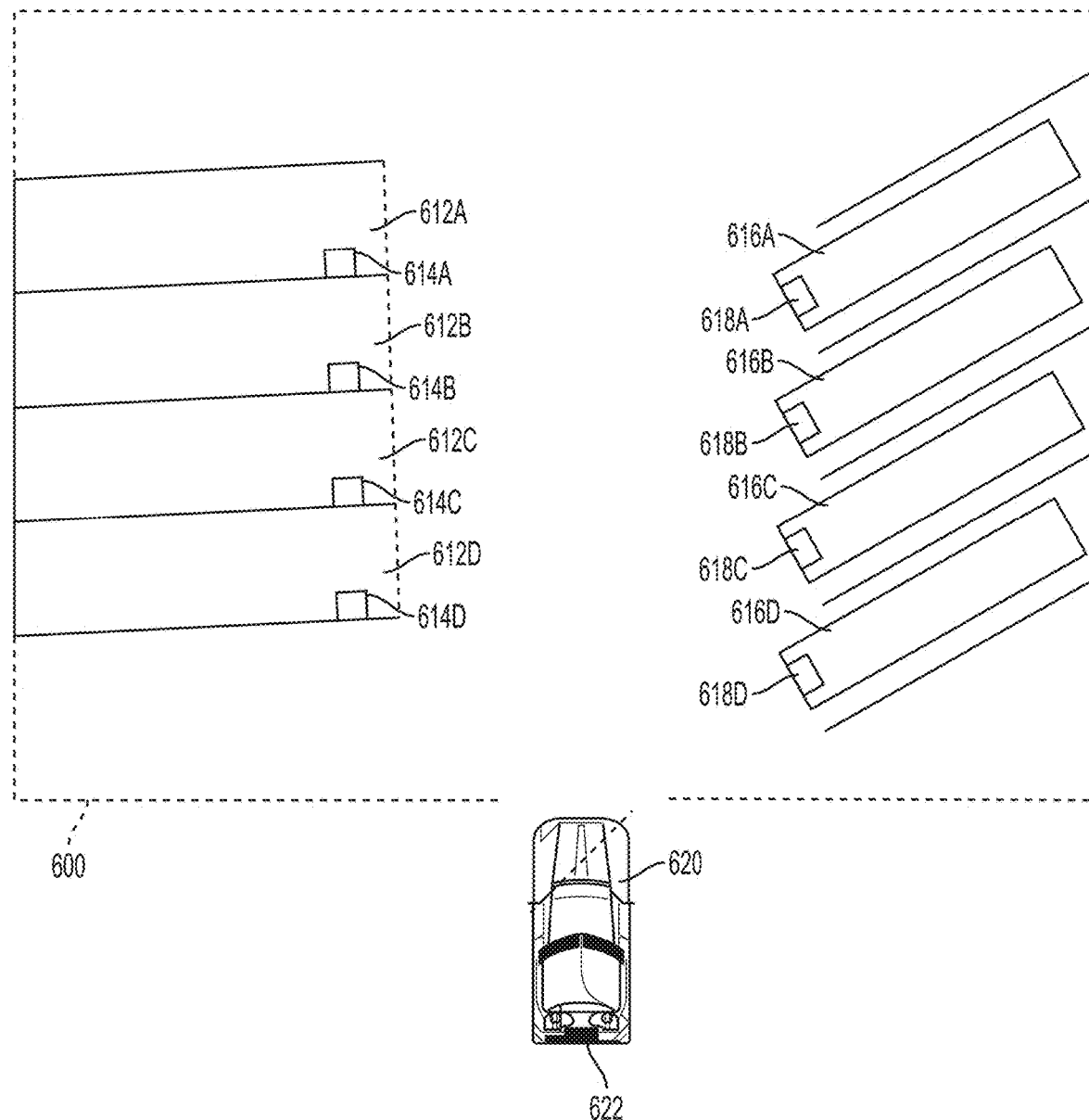
FIG. 6 is an overhead view illustrating loading of a trailer on a truck in a loading bay according to one embodiment of the disclosure.

Another configuration of electronic devices to assist in long-distance trucking is described with reference to FIG. 6. FIG. 6 is an overhead view illustrating loading of a trailer on a truck in a loading bay according to one embodiment of the disclosure. A loading area 600 may include a number of loading bays 612A, 612B, 612C, and 612D with electronic devices 614A, 614B, 614C, and 614D, respectively, such as beacons. The loading area 600 may also include a parking area with parked trailers 616A, 616B, 616C, and 616D. Each of the parked trailers 616A-D may include an electronic device 618A, 618B, 618C, and 618D, respectively. The devices 618A-D may be passive beacons used to uniquely identify the trailers 616A-D. A vehicle 620 may enter the loading area 600 to receive an assigned trailer. A gateway 622 attached to the vehicle 620 may receive an expected identifier for the assigned trailer. When the vehicle 620 approaches and backs up to one of the trailers 616A-D, the gateway 622 may activate the passive beacon in the trailer nearest the truck 620. The beacon may transmit its identifier to the gateway 622, and the gateway 622 may verify that the correct trailer is attached to the vehicle 620. Although passive beacons are described in this example, active beacons may also be used. A process for verifying the assigned trailer is described in more detail below with reference to FIG. 7.

Figure 7:
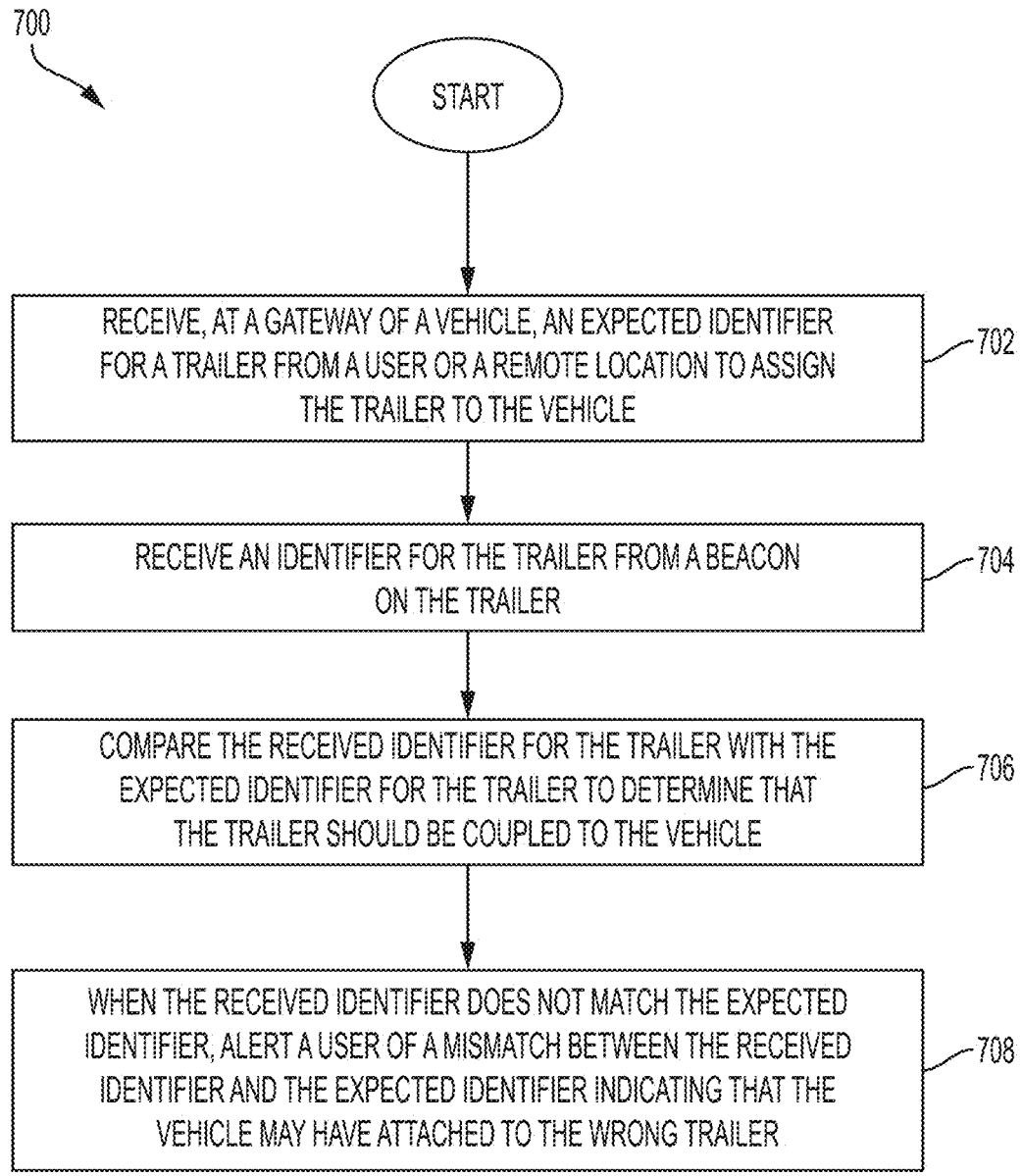
FIG. 7 is a flow chart illustrating a method of verifying a nearby trailer according to one embodiment of the disclosure.

FIG. 7 is a flow chart illustrating a method of verifying a nearby trailer according to one embodiment of the disclosure. A method 700 may begin at block 702 with receiving, at the vehicle gateway, an expected identifier for a trailer to assign the trailer to the vehicle. For example, the vehicle gateway may receive the expected identifier from a remote server through the Internet or from local input. Then, at block 704 as the truck approaches a parked trailer, an identifier for the trailer is received from a beacon on the trailer or a local user. In one example, as a truck is passing nearby the trailers are scanned and the user alerted to the presence of the desired trailer so that the user may back the truck up to the trailer. In other embodiments, the gateway may not scan the trailer until the truck is in contact with the trailer, such as through a hitch, and then a user may be alerted if the wrong trailer is being picked up.

Next, at block 706, the vehicle gateway compares the received identifier for the trailer received at block 704 with the expected identifier for the trailer received at block 702 to determine that the trailer should be coupled to the vehicle. If the trailer cannot be verified, then, at block 708, a user may be alerted to a mismatch between the received identifier and the expected identifier indicating that the vehicle may have attached to the wrong trailer. For example, a trailer may be verified when the gateway receives a correct identifier or secret code from the parked trailer. In other embodiments, a trailer may be verified when beacons in the trailer confirm cargo identifications that match expected cargo.

The vehicle gateway may also be used to check-in and check-out the trailers from the loading area to allow centralized tracking of the trailers. For example, when the vehicle departs the loading area with a trailer, the vehicle gateway may contact a loading area gateway and transmit the identifier for the trailer. Gateways may be located at an entry and exit of the loading area to signal to any departing vehicles for authorization to remove trailers. In some embodiments, the gateways may be located at an entry and exit of the loading area and scan trailers for beacons as they arrive and depart to track the trailers. Return of the trailer to a loading bay may likewise be communicated. For example, when the trailer is returned, the vehicle gateway may initiate communication with a loading area gateway, transmit, to the loading area gateway, the identifier for the trailer to indicate a parking of the trailer in a loading area, and disconnecting communications from the beacon in the trailer. In some embodiments, the trailer may be returned to a loading bay, in which the loading bay has its own gateway for managing trailers and cargo in the loading. In this configuration, the vehicle gateway may transmit information to the loading bay gateway corresponding to the loading that the trailer was delivered to.

Figure 8:
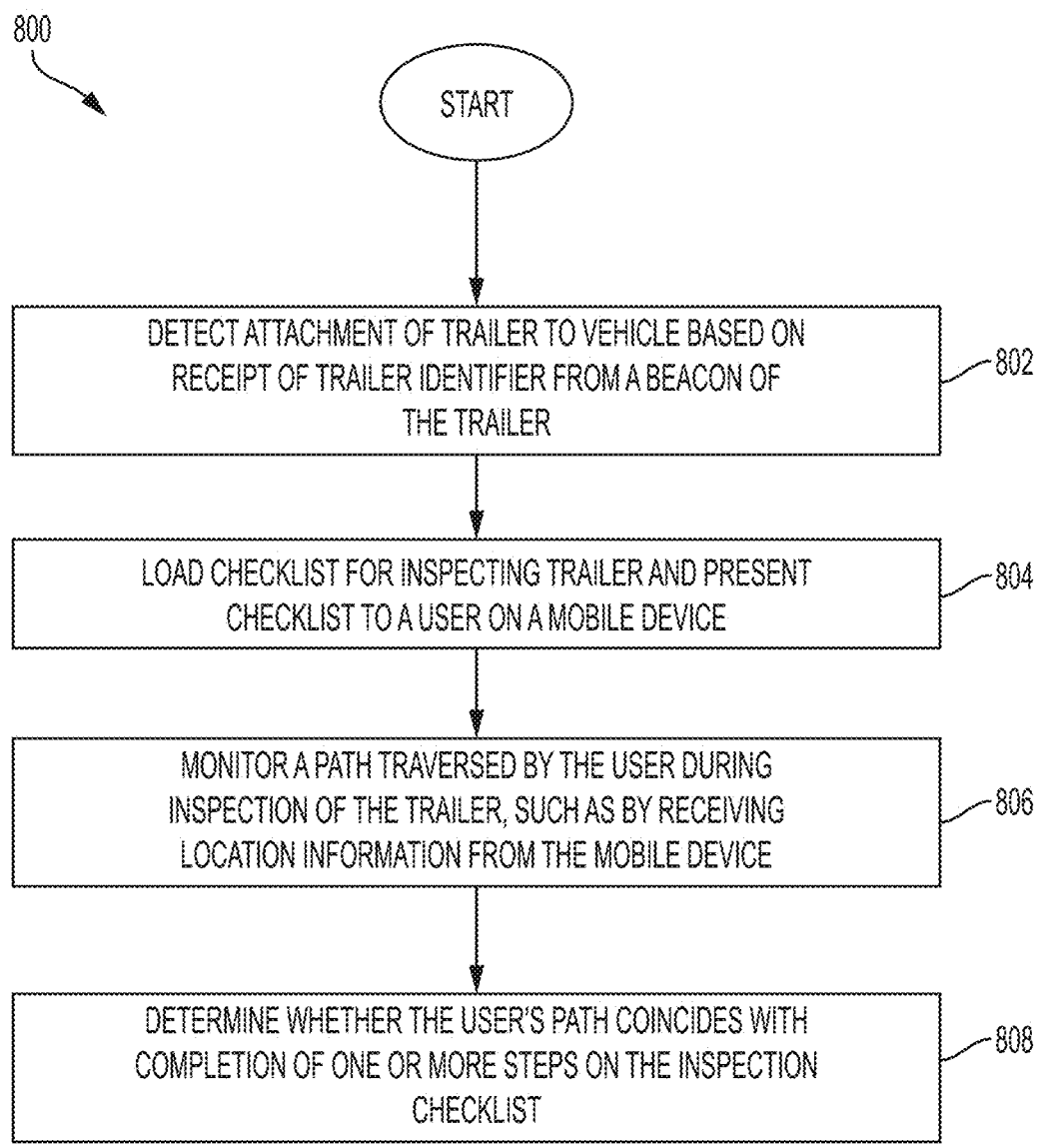
FIG. 8 is a flow chart illustrating a method of verifying inspection of a nearby trailer according to one embodiment of the disclosure.

When a trailer is picked up by a truck, the driver may be required to inspect the trailer. The vehicle gateway may be used to verify that the driver completes the required inspection. One method for verifying the inspection is described with reference to FIG. 8. FIG. 8 is a flow chart illustrating a method of verifying inspection of a nearby trailer according to one embodiment of the disclosure. A method 800 begins at block 802 with detecting an attachment of a trailer to a vehicle. The gateway may detect the attachment, for example, when a trailer identifier is received from a beacon on the trailer, as in block 704 of FIG. 7. In some embodiments, the receipt of the trailer identifier may indicate the attachment of the trailer when the wireless communications is configured to allow communications in a specific region, such as by using interference signals. In some embodiments, the tractor may include load sensors to indicate when a load is attached to the tractor. In other embodiments, the receipt of the trailer identifier may indicate the attachment of the trailer when a wired signal is received with the trailer identifier, in which the wire connects through the hitch connecting the trailer to the tractor. In some embodiments, the vehicle gateway may have an input device coupled to an electronic device that monitors for a physical connection to the trailer. After connecting the trailer, the method 800 continues to block 804 to load a checklist for inspecting the trailer. That checklist may be displayed to a user, such as by transmitting the checklist to the user's mobile device and displaying the checklist in a mobile application. As the driver completes the checklist, which may involve inspecting several locations around the trailer such as each tire, the vehicle gateway may monitor the user's path at block 806.

The user's compliance with the checklist may be monitored by any of several different techniques. For example, the user's mobile device may include a global positioning system (GPS) that allows the mobile device to determine the user's location and report the location to the vehicle gateway. As the user walks around the trailer, the GPS coordinates may indicate whether the user fulfilled each item on the checklist. As another example, the vehicle gateway may measure the user's position relative to the gateway and determine the user's path. The vehicle gateway may monitor phase shift or time delay for communicating with the user's mobile device. The vehicle gateway may also use other sensors or gateways nearby to triangulate the user's position as the user completes the checklist. As yet another example, the user's mobile device, which may be a smart watch, may include an accelerometer to determine the user's movement. The accelerometer data may be analyzed to determine a user's path or distance walked, and that analysis may be used to determine if sufficient distance was traversed to complete the inspection checklist. As a further example, the user may use their mobile device to scan barcodes, take pictures, or provide other input to the mobile device that indicates a path taken by the user. Several QR codes may be located around the trailer at inspection points, and taking pictures of the QR codes may indicate which inspection points were visited by the user.

After monitoring the user at block 806, the vehicle gateway may determine whether certain characteristics the user's path coincides with completion of the steps of the inspection checklist. For example, if the monitored data at block 806 is GPS locations, the vehicle gateway may compare relative movement of the user to the location of the trailer to determine if each inspection point was visited. As another example, if the monitored data at block 806 is accelerometer data, the vehicle gateway may compare movement distances and pauses between movement to determine if each inspection point was visited and for a sufficient amount of time to complete review. As a further example, if the received location information at block 806 is image captures, the vehicle gateway may analyze the pictures with image recognition or process pictures of QR codes to determine if each of the inspection points was visited and if the total time spent capturing the pictures indicates that sufficient time was spent inspecting the trailer.

If some of the steps of the inspection checklist were not completed, the user may be notified of the missing steps. By verifying completion of the inspection checklist, trailer operation may be safer and more efficient.

Figure 9:
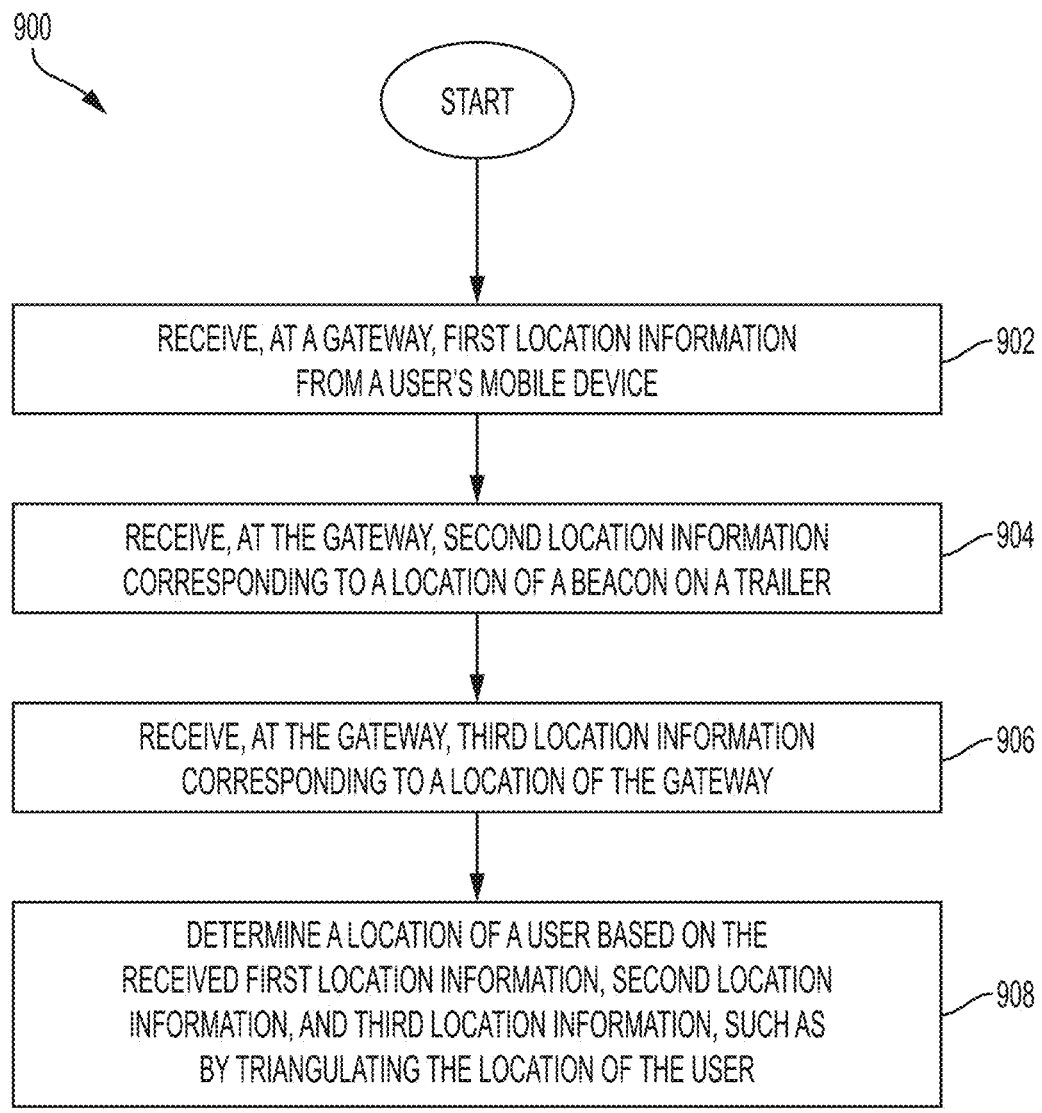
FIG. 9 is a flow chart illustrating a method of determining a user location around a nearby trailer, which may aid in verifying inspection, according to one embodiment of the disclosure.

As described above regarding block 806, one manner of tracking a user's path during inspection is triangulation using multiple electronic devices in and around the vehicle. One example of such triangulation is described with reference to FIG. 9. FIG. 9 is a flow chart illustrating a method of determining a user location around a nearby trailer, which may aid in verifying inspection, according to one embodiment of the disclosure. A method 900 begins at block 902 with receiving at a vehicle gateway first location information from a user's mobile device, at block 904 with receiving second location information corresponding to a location of a beacon on a trailer, and at block 906 with receiving third location information corresponding to a location of the vehicle gateway. Then, at block 908, the vehicle gateway may determine the location of the user based on the first, second, and third location information. The user location may be a relative location with respect to the trailer or vehicle gateway, rather than an absolute location on a map. The first, second, and third location information may include GPS positioning data and/or distances from various objects measured by, for example, time delay of communications signals. By having, for example, the relative distances between the gateway, the beacon, and the user's mobile device, and an absolute location for the gateway, the user's position may be determined.

Figure 10:
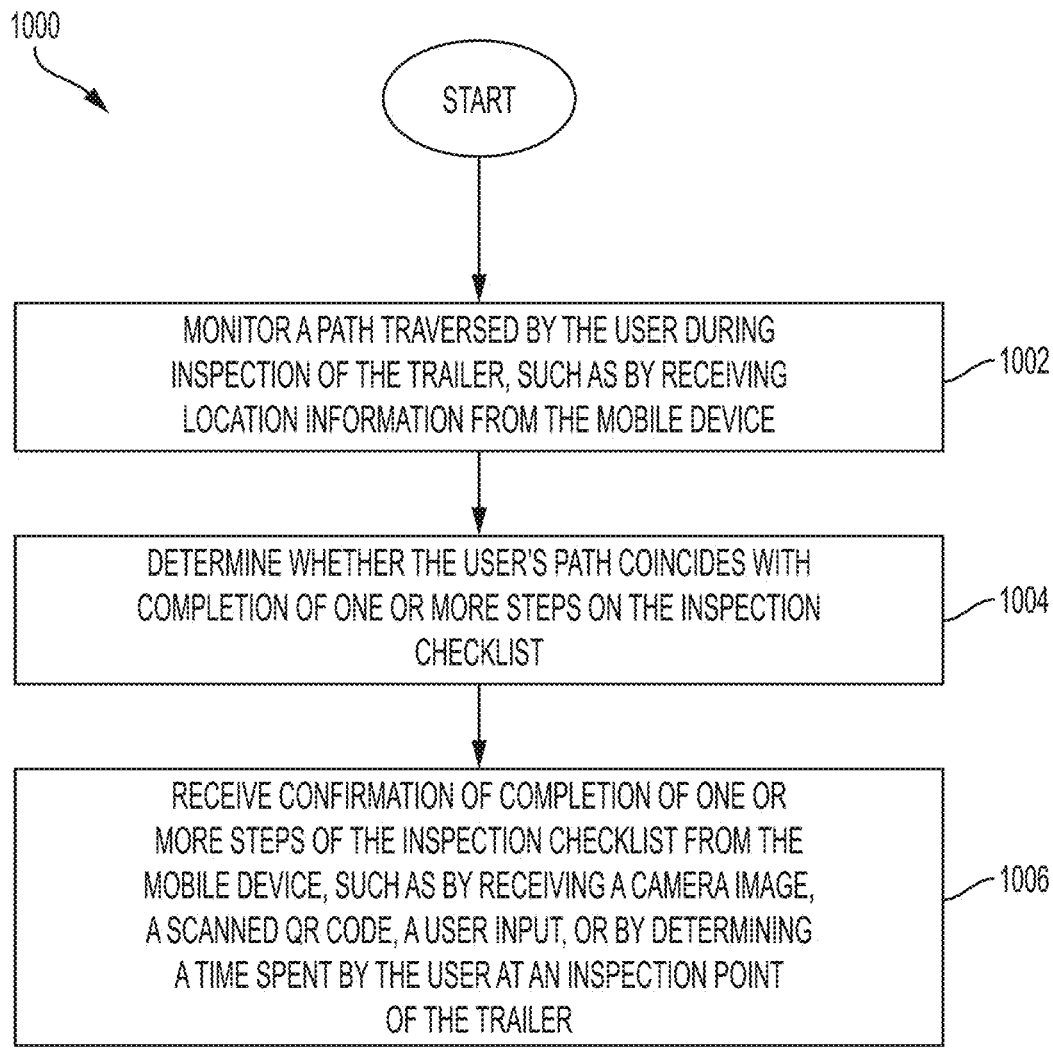
FIG. 10 is a flow chart illustrating a method of receiving additional verification of inspection of a nearby trailer according to one embodiment of the disclosure.

In some embodiments, a user's path during inspection may be monitored by a combination of techniques, such as monitoring both the user's location and requesting confirmation from the user after each step of the inspection. One such method using a combination of techniques is described with reference to FIG. 10. FIG. 10 is a flow chart illustrating a method of receiving additional verification of inspection of a nearby trailer according to one embodiment of the disclosure. A method 1000 may begin at block 1002 with a vehicle gateway receiving information for a path traversed by the user during inspection of the trailer, such as by receiving location information for the mobile device as either GPS coordinates or a triangulated location. Next, at block 1004, the vehicle gateway may determine whether the user's path coincides with completion of the one or more steps on the inspection checklist. At block 1006, confirmation of completion of one or more steps of the inspection checklist may be received by the vehicle gateway from the mobile device. The confirmation may be, for example, a user input to check a box on a display and a time of the check, a scanned QR code, an image of a part of the trailer, or a time spent at an inspection point. The confirmations at block 1006 may be received throughout inspection, while monitoring the path, and then processed at the end of the inspection to determine compliance. Alternatively, the confirmations at block 1006 may be received throughout inspection, while monitoring the path, and processed during the inspection, such that a user may be alerted if they skip a step during the inspection.

Figure 11:
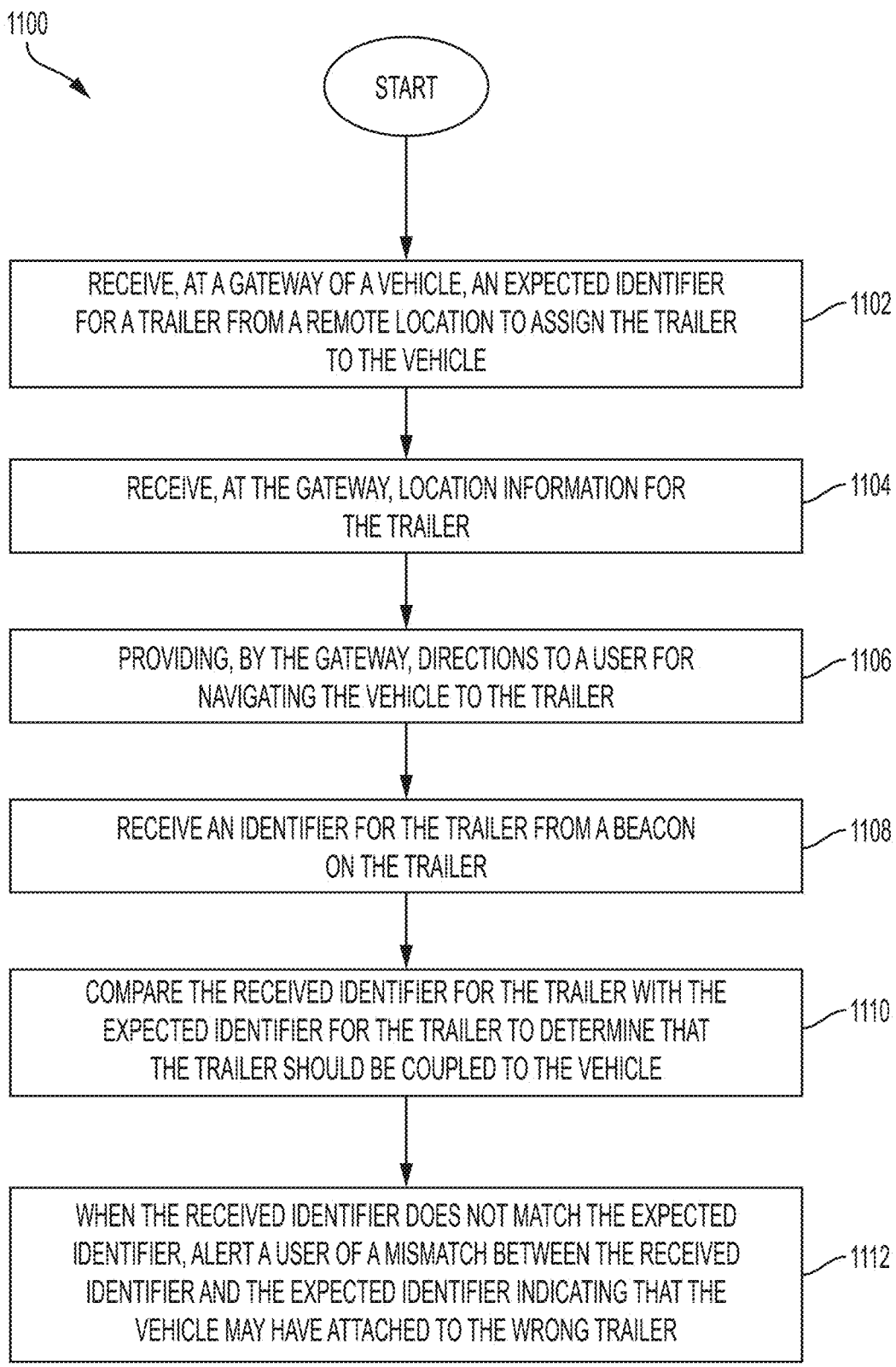
FIG. 11 is a flow chart illustrating a method of routing a vehicle to an assigned trailer for pick-up according to one embodiment of the disclosure.

The vehicle gateway may also be programmed to provide other functionality and benefits to a user. As described above with reference to FIG. 7, the vehicle gateway may verify that an assigned trailer has been picked up by a vehicle. Prior to verification of the assigned trailer, the vehicle gateway may provide the user with instructions to direct the vehicle to the assigned trailer to further reduce the likelihood of picking up the wrong trailer. One such method is described with reference to FIG. 11. FIG. 11 is a flow chart illustrating a method of routing a vehicle to an assigned trailer for pick-up according to one embodiment of the disclosure. A method 1100 may begin at block 1102 with the vehicle gateway receiving an expected identifier for a trailer that indicates the trailer is assigned to be picked up by the vehicle. The expected identifier may be received from a remote location, such as through the Internet from a server. The expected identifier may also or alternatively be received from a remote location, such as from a gateway in the loading bay. Next, at block 1104, the vehicle gateway may receive location information for the trailer. For example, the received expected identifier may be used to look-up a location of the trailer, or the received identifier may itself be location information for the trailer. Next, at block 1106, the vehicle gateway may generate directions and provide the directions to the user to navigate the vehicle to the assigned trailer. After the driver moves the vehicle in place near the trailer, an identifier for the trailer may be received at block 1108 and compared to the expected identifier received at block 1102 to determine if the correct trailer was picked up or is about to be picked up, similar to blocks 702, 704, and 706 of FIG. 7. At block 1112, the user may be alerted to the trailer being an incorrect trailer when the received identifier of block 1108 does not match the expected identifier received at block 1102. For example, an alert may be displayed on a vehicle dashboard, a GPS device, or a user's mobile device indicating that the vehicle may have attached to the wrong trailer.

The schematic flow chart diagrams of FIG. 7, FIG. 8, FIG. 9, FIG. 10, and FIG. 11 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a gateway, beacon, or electronic device may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuity may be configured as a general purpose processor capable of executing instructions contained in software. A beacon may have limited or no general processing capability, and thus only be able to receive and respond to requests and access storage local to the beacon. A gateway may have more, but still limited, processing capabilities compared to general purpose computers, although in some embodiments a gateway may be a general purpose computer. A gateway may also be configured to interface with input devices for receiving information from vehicle components and user devices, whereas a beacon may have limited or no communications capability for communicating with devices other than a gateway.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described as components in gateways, beacons, mobile devices, or electronic devices, aspects of the invention may be implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system, comprising:
    at least one input device comprising a communications radio configured to communicate with a beacon in a trailer;
    a gateway configured to attach to a vehicle and to couple to the at least one input device, wherein the gateway is configured to perform steps comprising:
        receiving, through the communications radio, an identifier for the trailer from the beacon;
        receiving, from the mobile device, confirmation of completion of one or more steps of an inspection checklist, wherein the received confirmation comprises at least one camera image;
        determining a path of a user of the mobile device around the vehicle based, at least in part, on the received confirmation of completion of one or more steps;
        determining whether the path of the user coincides with an inspection checklist for the trailer identified by the received identifier from the beacon; and
        when the path of the user indicates at least a part of the inspection checklist was not performed, alerting the user of the non-performed part of the inspection checklist.

2. The information handling system of claim 1, wherein the received confirmation comprises a determination, from the determined path of the user, of a time spent at one or more inspection points of the trailer corresponding to the one or more steps of the inspection checklist.

3. The information handling system of claim 1, wherein the determined path of the user is determined based on triangulation of the mobile device performed by steps comprising:
    receiving first location information from the mobile device;
    receiving second location information from the beacon;
    receiving third location information corresponding to a location of the gateway; and
    determining the path of a user of the mobile device around the vehicle based, at least in part, on the first location information, the second location information, and the third location information.

4. The information handling system of claim 1, wherein the gateway is configured to perform steps comprising:
    receiving a location of the trailer; and
    providing directions to a user for driving the vehicle to the location of the trailer before receiving an identifier for the trailer.

5. The information handling system of claim 1, wherein the gateway is configured to perform steps comprising:
    initiating communication with a loading area gateway through the communications radio;
    transmitting, to the loading bay gateway, the received identifier for the trailer to indicate a parking of the trailer in a loading area; and
    disconnecting communications from the beacon in the trailer.

6. The information handling system of claim 1, wherein the gateway is configured to perform steps comprising:
    initiating communication with a loading area gateway through a communications radio; and
    transmitting, to the loading area gateway, the received identifier for the trailer to indicate a checking out of the trailer from the loading area.

7. The information handling system of claim 1, wherein the at least one input device is integrated with the gateway.

8. A method, comprising:
receiving, at the vehicle gateway, an identifier for the trailer from the beacon;
receiving, from the mobile device, confirmation of completion of one or more steps of an inspection checklist, wherein the received confirmation comprises at least one camera image;
determining a path of a user of the mobile device around the vehicle based, at least in part, on the received confirmation of completion of one or more steps;
determining whether the path of the user coincides with an inspection checklist for the trailer identified by the received identifier from the beacon; and
when the path of the user indicates at least a part of the inspection checklist was not performed, alerting the user of the non-performed part of the inspection checklist.

9. The method of claim 8, wherein the received confirmation comprises a determination, from the determined path of the user, of a time spent at one or more inspection points of the trailer corresponding to the one or more steps of the inspection checklist.

10. The method of claim 8, wherein the determined path of the user is determined based on triangulation of the mobile device performed by steps comprising:
receiving first location information from the mobile device;
receiving second location information from the beacon;
receiving third location information corresponding to a location of the gateway; and
determining the path of a user of the mobile device around the vehicle based, at least in part, on the first location information, the second location information, and the third location information.

11. The method of claim 8, further comprising:
receiving a location of the trailer; and
providing directions to a user for driving the vehicle to the location of the trailer before receiving an identifier for the trailer.

12. The method of claim 8, further comprising:
initiating communication with a loading bay gateway through the communications radio;
transmitting, to the loading bay gateway, the received identifier for the trailer to indicate a parking of the trailer in a loading bay corresponding to the loading bay gateway; and
disconnecting communications from the beacon in the trailer.

13. The method of claim 8, further comprising:
initiating communication with a loading area gateway through a communications radio; and
transmitting, to the loading area gateway, the received identifier for the trailer to indicate a checking out of the trailer from the loading area.

14. An information handling system, comprising:
at least one input device comprising a communications radio configured to communicate with a beacon in a trailer;
a gateway configured to attach to a vehicle and to couple to the at least one input device, wherein the gateway is configured to perform steps comprising:
receiving an expected identifier for the trailer;
receiving an identifier for the trailer from the beacon;
comparing the received identifier with the expected identifier to determine that the trailer should be coupled to the vehicle;
when the received identifier does not match the expected identifier, alerting a user of a mismatch between the received identifier and the expected identifier;
when the received identifier does match the expected identifier:
determining an inspection checklist for the trailer;
receiving a confirmation of completion of one or more steps of the inspection checklist;
determining a path of a user of the mobile device around the vehicle based, at least in part, on the received confirmation of completion of one or more steps;
determining whether the path of the user coincides with an inspection checklist for the trailer identified by the received identifier from the beacon; and
when the path of the user indicates at least a part of the inspection checklist was not performed, alerting the user of the non-performed part of the inspection checklist.

15. The information handling system of claim 1, wherein the step of determining a path of a user of the mobile device around the vehicle is also based, at least in part, on accelerometer data.

16. The information handling system of claim 1, wherein the step of determining a path of a user of the mobile device around the vehicle is also based, at least in part, on a global positioning system (GPS) location.

17. The information handling system of claim 1, wherein the received confirmation comprises at least one camera image comprises a QR code.

18. The method of claim 8, wherein the step of determining a path of a user of the mobile device around the vehicle is also based, at least in part, on accelerometer data.

19. The method of claim 8, wherein the step of determining a path of a user of the mobile device around the vehicle is also based, at least in part, on a global positioning system (GPS) location.

20. The method of claim 8, wherein the received confirmation comprises at least one camera image comprises a QR code.

* * * * *